(No Model.)  2 Sheets—Sheet 1.

E. G. SEITZ.
TWO WHEELED VEHICLE.

No. 311,922. Patented Feb. 10, 1885.

Witnesses:
Henry V. Higgins
John H. Cornett

Inventor:
Edward Gottlieb Seitz (No Model.) 2 Sheets—Sheet 2.
E. G. SEITZ.
TWO WHEELED VEHICLE.
No. 311,922. Patented Feb. 10, 1885.
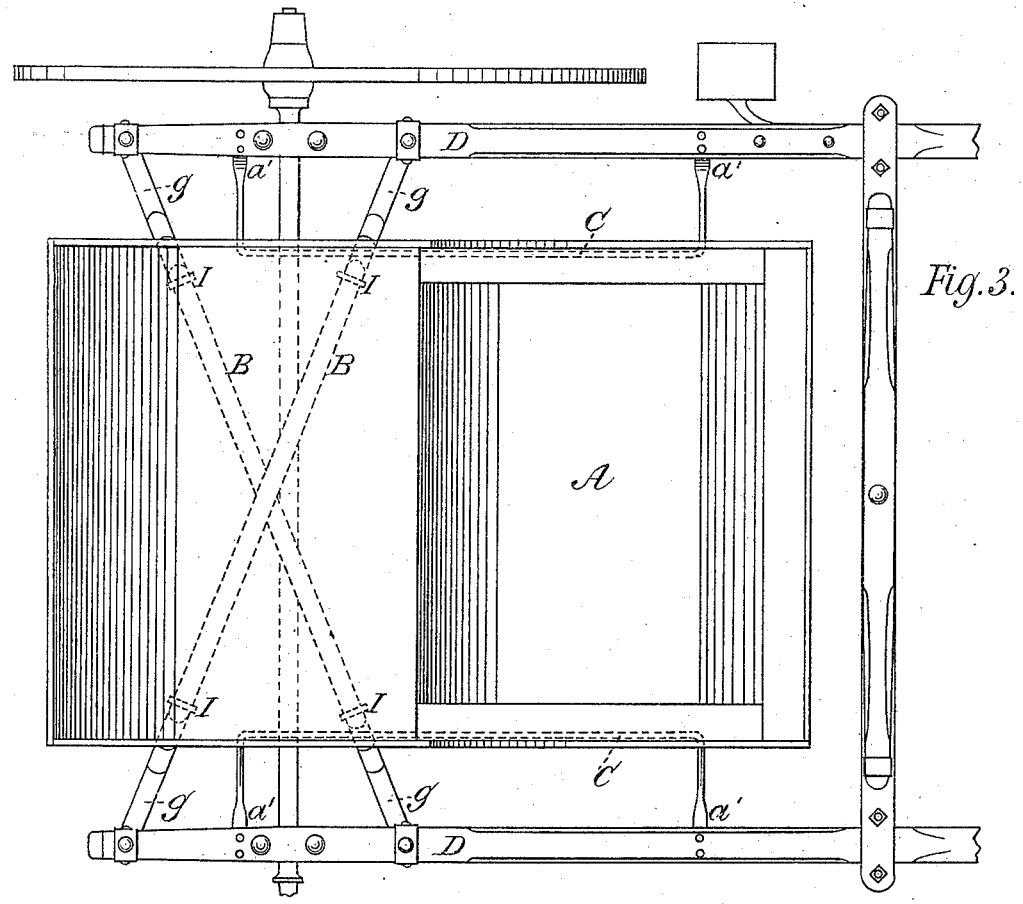
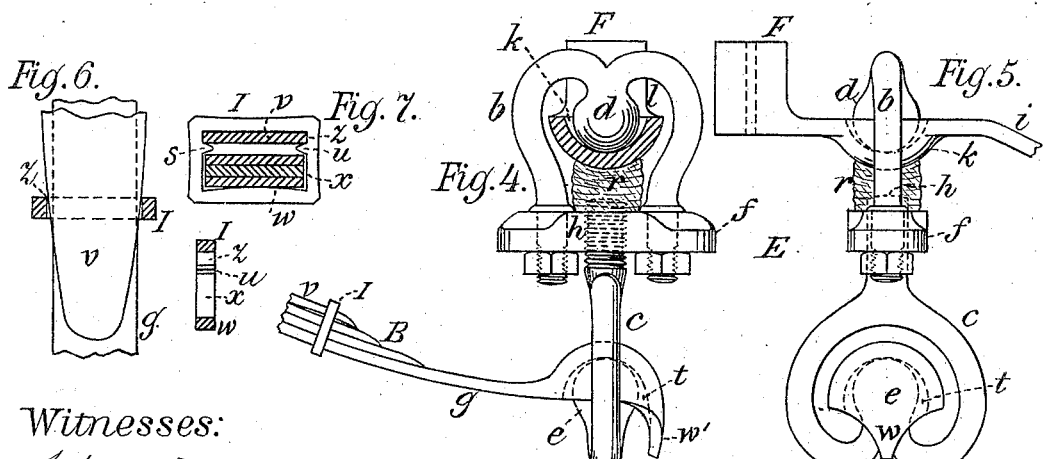
Witnesses:
Henry V. Higgins
Inventor:
Edward Gottlieb Seitz

UNITED STATES PATENT OFFICE.

EDWARD GOTTLIEB SEITZ, OF CHICAGO, ILLINOIS.

TWO-WHEELED VEHICLE.

SPECIFICATION forming part of Letters Patent No. 311,922, dated February 10, 1885.

Application filed June 9, 1884. (No model.)

*To all whom it may concern:*

Be it known that I, EDWARD GOTTLIEB SEITZ, a citizen of the United States of America, residing in Chicago, in the county of Cook and State of Illinois, have invented new and useful Improvements in Carriages and Wagons, of which the following is a specification.

My invention relates to improvements in the mode of balancing and securing the body in its position, especially concerning two-wheel vehicles; and it consists, chiefly, in the introduction of an adjustable spring-coupling in connection with a coupling-brace, and in the adaptation of a torsion-spring and supporter and a spring-clamp for directing the motions of the spring-plates when actuated upon, toward the coupling, all combined and connected together to relieve the axle of the driving-wheels from strain, preventing sudden jerks or rocking disposition of the body, and secure an independent movement of the same from the motions of the animal in a superior manner, as heretofore accomplished.

The several matters of improvement will be fully herein set forth, and consist in the construction of the combined parts, as specified in the claims.

Figures 1, 8, 9:
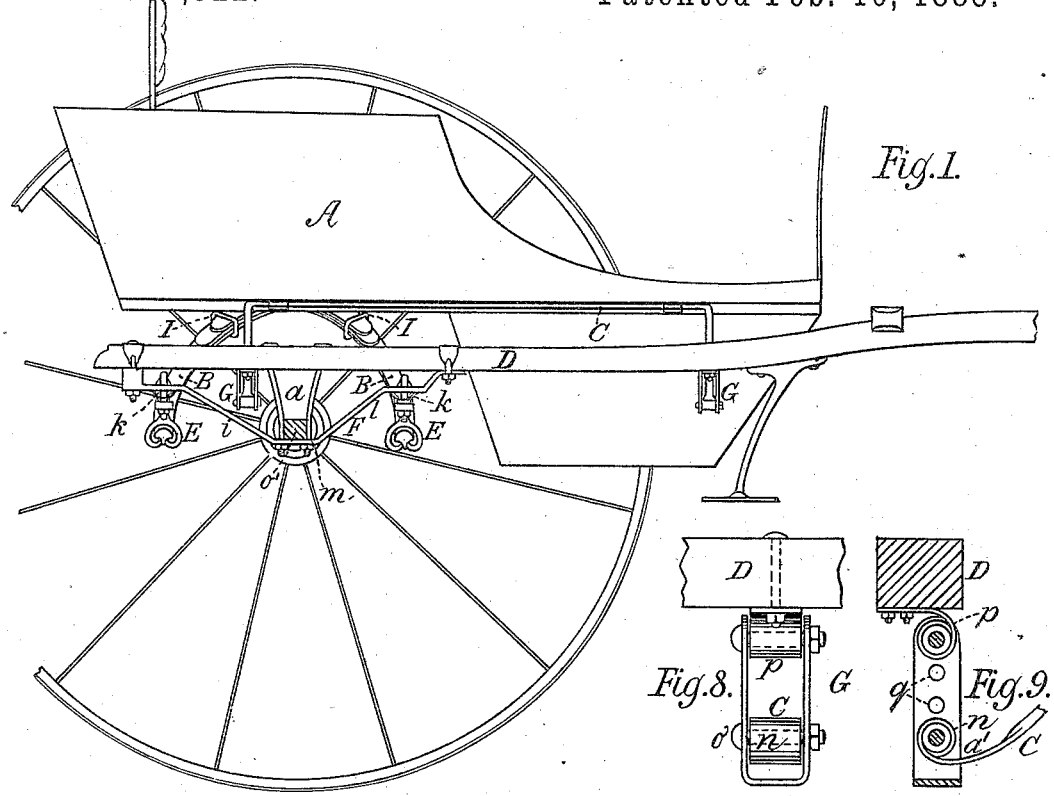
Figure 2:
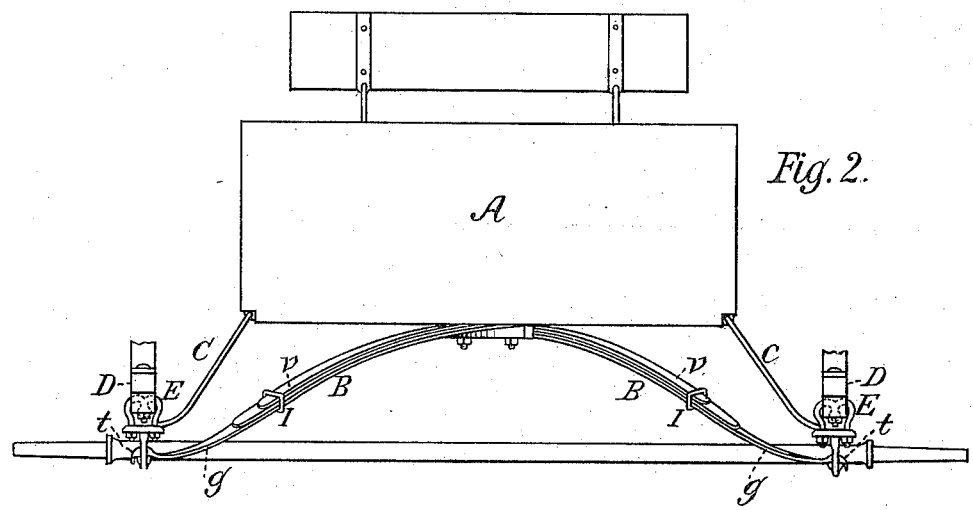

Referring to the accompanying drawings, Figure 1 represents a vehicle in front elevation, showing the adjustable coupling device connected to the main spring and the position of the body-supporting torsion-spring with its supporting-frame on the shaft. Fig. 2 shows an end view of the foregoing one, and Fig. 3 is a top view in relation of Fig. 1. Figs. 4 and 5 represent in detail, on enlarged scale, the adjustable spring-coupling device in connection with its supporting-brace, Figs. 6 and 7 showing in detail the spring-clamp attached to a series of spring-plates, for keeping the same in position; and Figs. 8 and 9 exhibit in front and sectional view the suspended frame for supporting the ends of the torsion-spring.

The body A, as represented in the drawings, is that of a vehicle of the light-running kind, connected to the shafts, and secured in position by the main spring B B and torsion-spring C C. The former is in connection with adjustable spring-couplings E E. The same are supported by a coupling-brace, F, and the latter are in connection with supporting-frames or yokes G G, attached to the shafts D of the vehicle. The same are secured to the axle $o'$ by means of an extending arm, $a$, from the shaft, fastened to the lower portion of the brace-bar.

B B represent the main spring mounted to the body of the vehicle in a secure manner, which spring is, as usually, composed of a number of elastic plates or levers. The same are kept in position by a fitting spring-clamp, I, constructed for the purpose, as will be further on described. The end of the lower spring-plate, $g$, of the main spring is underneath impressed in form of a cup or socket, $t$, its front part being provided with a downward-projecting cover, $w'$, for connection with the spring-coupling, the said cover extending beyond the neck of the stud, preventing the spring end from leaping out of its resting-place.

The spring-coupling E is composed of two iron sections, $b\ c$, screwed together in middle, as shown in Figs. 4 and 5 of the drawings, the same representing the form of stirrups, each having its bended branches united in center, terminating into heads or studs $d\ e$ of spherical shape, the same projecting in line of center toward each other. The upper section, $b$, of the coupling has its branches partially projecting through fitting screw-holes of a plate, $f$, secured to the same by tightening-nuts, and said plate is further provided with an orifice in its center for the reception of the bolt $h$ on top of the lower section, $c$, thus uniting both sections. The lower one is intended to carry on its stud $e$ the end $t$ of the spring-plate $g$, for supporting the main spring, while the stud $d$ of the upper section $b$ fits in the socket $k$ of the supporting-brace and with its connected parts in suspended condition, adjusts itself to the prevailing motions of the spring. The screw-bolt $h$ can be raised or lowered in the orifice on plate $f$ according to the length of the main-spring plate.

F is an iron brace-bar for supporting the spring-coupling, and consists, principally, of inclined projecting front and rear portions, $i\ l$. The same are secured to the shaft and their common base $m$ is fastened underneath the axle $o'$ of the hind wheels in a substantial manner. The end portions of the brace-bar are provided with sockets $k\ k$, for supporting the stud $d$ of the upper coupling-section, $b$, and the same is securely held in position by a rubber spring, r, wedged into the space between the brace and the coupling.

C is a torsion-spring applied laterally at the middle portion of the vehicle's body for the purpose of supporting the same in its positions, and is made of a steel bar of sufficient strength, and, to suit the purpose, bent at right angles at its ends, the same flattened out toward their extreme end a', which is turned around in shape of a cylindrical hollow head, n.

G represents the supporting-frame of the torsion-spring, its upper or top part connected to a spring-plate, p, which is securely fastened underneath to the shaft D, and its lower suspended part connected with the end portion of the spring. The head n of the latter enters for this object the lower part of the frame, and is arrested there by a passing screw-bolt, o, passed through the hollow head, and its position can be readily adjusted higher or lower by means of a series of bolt-holes, q, on the sides of the frame, according to the height of the animal in use. The top plate, p, is similarly connected to the frame as the ends of the torsion-spring, and consequently allows the same to oscillate in accord with the action of the twisting-spring.

I is a spring-clamp engaged to embrace the plates of the main spring B, and consists of a square metal frame with concave-shaped sides for strengthening the same, and mounted on their inner surface near the upper end with opposite projecting conical points s u, intended to separate and detain the end portion of the upper spring-plate, v, from the action of the remaining ones, thus providing an independent sliding motion of the plates in the loosely-fitting remaining compartment x, below the projecting conical points, while the wider and tapered end portion of the top spring-plate, v, enters, and remains firmly wedged in the limited upper space, z, of the clamp for guiding the expanding or contracting motions of the plates beneath on the arched bottom w, allowing there a limited twisting motion of the plates, when actuated, and the same is prominent in keeping the springs operating in the direction toward their jointed couplings. These combined arrangements, as described, secure the jointed parts to act in their respective positions, permitting sliding or stretching of the springs in horizontal directions with the couplings, or rolling disposition of the spring ends within certain limits on the studs and partially on the lower part of the sprig-clamps, caused from the saltatory motions of the vehicle, and in relation with the lateral attached torsion-springs on the body regulates and equalizes the pressure of the load, relieves the axle from strain and the springs from extreme vibrations or concussions.

I claim—

1. In combination with carriages and wagons, the construction of the adjustable spring-coupling E, consisting of sections b c, each provided with a spherical stud, d e, the same projecting in line of center each to the other, the upper section connected with plate f, having an orifice in center, the lower section provided with a screw-bolt, h, substantially as shown and described, and for the purpose specified.

2. In connection with the spring-coupling E, the brace-bar F, with inclined front and rear portions, i l, and base m, provided with sockets k k on their upper surface, substantially as described, and for the purpose specified.

3. In combination with the body of a vehicle, the spring-coupling E and coupling-brace F, the main spring B, having on the ends of the lower spring-plate, g, an impression or socket, t, the same provided with a cover, w', substantially as shown and described, and for the purpose specified.

4. In connection with the plates of the main spring B of the body of a vehicle, the spring-clamp I, with concave-shaped sides, the same provided with opposite projecting conical points s u, and arched bottom w, substantially as described, and for the purpose specified.

5. In combination with the body of the vehicle and main spring B, the torsion-spring C, having bended ends a', the same flattened out and shaped into a cylindrical head, n, substantially as described, and for the purpose specified.

6. In combination with the body of a vehicle, the main spring B, provided with clamp I and sockets k k at the ends of the lower plates, connected with spring-couplings E E, torsion-spring C, with head n, the supporting yoke or frame G of the same, having holes q on its sides for adjustment, and top plate, p, all arranged and constructed substantially as and for the purpose herein set forth.

In testimony whereof I have hereunto set my hand in the presence of two subscribing witnesses.

EDWARD GOTTLIEB SEITZ.

Witnesses:
HENRY V. HIGGINS,
JOHN McCORMICK.